366-349 AU 242 EX
FIP8312 OR AI 97
EXAMINER
J. O'Neil,
Churn.
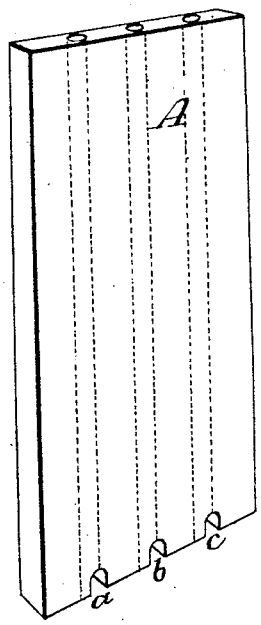
No. 97. a. I (AI) Patented May 13. 1851.